(12) United States Patent
Boberg et al.

(10) Patent No.: US 9,392,070 B2
(45) Date of Patent: Jul. 12, 2016

(54) METHOD AND ARRANGEMENT FOR HANDLING RESOURCE DATA

(75) Inventors: Christer Boberg, Tungelsta (SE); Mikael Klein, Huddinge (SE); Sofie Lassborn, Sollentuna (SE); Anders Lindgren, Alvsjo (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 164 days.

(21) Appl. No.: 13/139,525

(22) PCT Filed: Dec. 19, 2008

(86) PCT No.: PCT/SE2008/051520
§ 371 (c)(1),
(2), (4) Date: Jun. 14, 2011

(87) PCT Pub. No.: WO2010/071522
PCT Pub. Date: Jun. 24, 2010

(65) Prior Publication Data
US 2011/0252141 A1    Oct. 13, 2011

(51) Int. Cl.
*G06F 15/173* (2006.01)
*H04L 29/06* (2006.01)
(Continued)

(52) U.S. Cl.
CPC ............. *H04L 67/24* (2013.01); *H04L 65/1016* (2013.01); *H04W 48/02* (2013.01)

(58) Field of Classification Search
USPC ......... 709/201, 202, 203, 205, 206, 220, 223, 709/224, 225, 226, 227, 228, 229, 238, 243, 709/244, 245, 246, 248
IPC .......... H04L 67/24,67/00, 67/04, 67/06, 67/14, H04L 67/26, 67/28, 67/2804, 67/2809, 67/2814, H04L 67/2819, 67/2823, 67/2828, 67/2838, H04L 43/00, 43/02, 43/022, 43/026, 43/028, 43/06, 43/062, 43/065, 63/00, 63/02, 63/0209, 63/0227, 63/0236, 63/0245, 63/0254, 63/0263, 63/0272, 63/0281, 41/00, 41/50, 41/5003, 41/5029, 41/5032, 41/5035, 41/5038, 41/5041, 41/5058, 65/1013, 65/1016; H04W 48/02, H04W 48/04, 48/06, 48/08, 48/16, 48/17, H04W 48/18, 48/20; G06F 17/30861, 17/30864, G06F 17/30867; H04H 60/06
See application file for complete search history.

(56) References Cited

U.S. PATENT DOCUMENTS 5,983,270 A * 11/1999 Abraham et al. ............. 709/224
6,658,095 B1 * 12/2003 Yoakum et al. ............ 379/93.01
(Continued)

FOREIGN PATENT DOCUMENTS

CN      1852323 A      10/2006
CN      1859139 A      11/2006
(Continued)

OTHER PUBLICATIONS

Office Action issued on Apr. 28, 2013, in corresponding Chinese Application No. 200880132455.1, 11 pages.

*Primary Examiner* — Saket K Daftuar
(74) *Attorney, Agent, or Firm* — Rothwell, Figg, Ernst & Manbeck, P.C.

(57) ABSTRACT

A method and arrangement in a notification server (300) for controlling notifications with resource data to a subscribing client (A). When a subscription request is received (3:1) from the client for notifications with selected resource data of one or more resources, the access network currently used by the client is determined based on network related information, e.g. obtained from the received subscription request. The delivery of notifications (3:5) is then controlled based on the determined current network.

18 Claims, 3 Drawing Sheets

(51) Int. Cl.
*H04L 29/08* (2006.01)
*H04W 48/02* (2009.01)

(56) References Cited

U.S. PATENT DOCUMENTS

| | | | | |
|---|---|---|---|---|
| 6,771,971 | B2* | 8/2004 | Smith | 455/456.1 |
| 7,170,863 | B1* | 1/2007 | Denman et al. | 370/260 |
| 7,702,726 | B1* | 4/2010 | Grabelsky et al. | 709/204 |
| 8,046,476 | B2* | 10/2011 | Trossen et al. | 709/229 |
| 8,095,610 | B2* | 1/2012 | Gould et al. | 709/207 |
| 8,335,860 | B2* | 12/2012 | Moran et al. | 709/246 |
| 8,997,091 | B1* | 3/2015 | Watson et al. | 717/175 |
| 2002/0083127 | A1* | 6/2002 | Agrawal | 709/203 |
| 2002/0120687 | A1* | 8/2002 | Diacakis et al. | 709/204 |
| 2002/0131395 | A1* | 9/2002 | Wang | 370/349 |
| 2002/0133627 | A1* | 9/2002 | Maes et al. | 709/246 |
| 2002/0147000 | A1* | 10/2002 | Holmes-Kinsella | 455/405 |
| 2003/0008661 | A1* | 1/2003 | Joyce et al. | 455/456 |
| 2003/0040280 | A1* | 2/2003 | Koskelainen | 455/67.1 |
| 2003/0041101 | A1* | 2/2003 | Hansche et al. | 709/203 |
| 2003/0073440 | A1* | 4/2003 | Mukherjee et al. | 455/435 |
| 2003/0135582 | A1* | 7/2003 | Allen et al. | 709/217 |
| 2003/0174814 | A1* | 9/2003 | Diacakis | 379/80 |
| 2003/0217099 | A1* | 11/2003 | Bobde et al. | 709/202 |
| 2004/0059781 | A1* | 3/2004 | Yoakum et al. | 709/204 |
| 2004/0098491 | A1* | 5/2004 | Costa-Requena et al. | 709/229 |
| 2004/0122977 | A1* | 6/2004 | Moran et al. | 709/246 |
| 2004/0153506 | A1* | 8/2004 | Ito et al. | 709/204 |
| 2004/0193920 | A1* | 9/2004 | Kiss et al. | 713/201 |
| 2004/0225717 | A1* | 11/2004 | Cuervo | 709/206 |
| 2004/0260749 | A1* | 12/2004 | Trossen et al. | 709/200 |
| 2005/0102389 | A1* | 5/2005 | Liscano et al. | 709/224 |
| 2005/0170861 | A1* | 8/2005 | Niemi et al. | 455/552.1 |
| 2006/0090005 | A1* | 4/2006 | Wu | 709/238 |
| 2006/0224750 | A1* | 10/2006 | Davies et al. | 709/229 |
| 2006/0271693 | A1* | 11/2006 | Thiebaut et al. | 709/229 |
| 2006/0286993 | A1* | 12/2006 | Xie et al. | 455/518 |
| 2007/0072605 | A1* | 3/2007 | Poczo | 455/432.2 |
| 2008/0070544 | A1* | 3/2008 | Lior | 455/404.1 |
| 2008/0162637 | A1* | 7/2008 | Adamczyk et al. | 709/204 |
| 2008/0176552 | A1* | 7/2008 | Hamano et al. | 455/422.1 |
| 2008/0208953 | A1* | 8/2008 | Tian | 709/201 |
| 2009/0196265 | A1* | 8/2009 | Mariblanca Nieves et al. | 370/338 |
| 2009/0213751 | A1* | 8/2009 | Langefeld et al. | 370/254 |
| 2009/0233578 | A1* | 9/2009 | Feder et al. | 455/410 |

FOREIGN PATENT DOCUMENTS

| | | |
|---|---|---|
| WO | 2008020705 A1 | 2/2008 |
| WO | 2008115100 A1 | 9/2008 |

* cited by examiner

| | Current Network | Notification Rules |
|---|---|---|
| Client A: | Home Network | No filter |
| | Visited Network X | Apply filter x |
| | Visited Network Y | No notifications |
| | Visited Network Z | No filter if TTL = 0<br>Apply filter z if TTL > 0 |
| Client B: | --- | --- |

METHOD AND ARRANGEMENT FOR HANDLING RESOURCE DATA

CROSS-REFERENCE TO RELATED APPLICATION

This application is a 35 U.S.C. §371 National Phase Entry Application from PCT/SE2008/051520, filed Dec. 19, 2008, the contents of which are incorporated herein by reference.

TECHNICAL FIELD

The invention relates generally to a method and arrangement for handling a subscription for resource data of an observed resource, such as a client, document or content service.

BACKGROUND

With the emergence of 3G mobile telephony, new packet-based communication technologies using IP (Internet Protocol) have been developed to support the usage of multimedia services, while different mobile and fixed user terminals with new functionalities for multimedia communication are emerging on the market. New services are also constantly being developed for terminal users to increase the field of usage and enhance the quality of experience when generally consuming multimedia services.

An IMS (IP Multimedia Subsystem) network can be used to enable multimedia services by initiating and controlling multimedia sessions for user terminals connected to various different access networks. Multimedia sessions are handled by specific session control nodes in the IMS network, referred to as CSCF (Call Session Control Function) nodes including the nodes P-CSCF (Proxy CSCF) and S-CSCF (Serving CSCF). Further, a database node HSS (Home Subscriber Server) stores subscriber and authentication data, and different application servers are used for delivering the multimedia services.

The signalling protocol called "SIP" (Session Initiation Protocol) is commonly used for handling multimedia sessions in IMS networks and other communication services networks. IMS is mentioned in this description for illustrative purposes, without limiting the invention to IMS networks exclusively. A user and his/her communication terminal is often referred to as a "client", which term will be generally used here.

A particular example of IMS enabled services is "presence" services, involving publication of presence data of a client to make it available to other clients or applications. Presence data basically refers to the status, situation or state of the client, e.g. including the client's current geographical position, connection status, service availability and terminal capabilities, as well as any personal characteristics, preferences and settings. Presence data can be stored in a presence server in the IMS network, based on the publication of such client related information. These publications may be obtained either from the client's terminal or from the access network used by the client, whenever any presence data of the client becomes available or is updated.

A client may also subscribe for selected presence data of one or more other clients, e.g. according to a predefined list of an established or predefined client group. Presence subscriptions are typically also handled by a presence server in the IMS network and may involve various information filters, admission rules and policies. The subscribing client can then receive notifications from the presence server regarding current presence data, subject to any prevailing filters, rules or policies, either automatically or upon request.

In SIP, a message called "PUBLISH" can be used by clients to provide data to the presence server. This message is used basically to initiate new data, "refresh" data (i.e. confirming that earlier initiated data continues to be valid), modify data, and to terminate data no longer valid. Further, a message called "SUBSCRIBE" can be used by clients to subscribe for presence data of other clients, as handled by the presence server, and only authorised clients are entitled to receive such data. Another message called "NOTIFY" can be used by presence servers to present presence data to subscribing clients. Yet another message called "REGISTER" can be used by clients to log on to an IMS network or an access network.

While presence services are mostly based on the publication of client data, a client may generally subscribe for data of any resource using basically the mechanism described above, which may be, apart from another client, any object of interest such as a document, a content service or information service. For example, a notification for group or data management may refer to changes in a document such as a contact list or address book. Further, notifications for content services or information services may refer to a stock exchange, weather forecast, sports results or any other information updates. In general, a resource data notification may refer to any state changes or updates of an observed resource according to a resource data subscription.

In this description, the term "subscribing client" represents a client that subscribes or requests for resource data, and the term "observed resource" represents a resource for which resource data is published to be available for authorised subscribing clients. In the context of presence services, a subscribing client is referred to as the "Watcher" and an observed client is referred to as the "Presentity". For example, a notification may also refer to a watcher request basically asking the presentity to authorize the watcher to receive certain presence information.

The SUBSCRIBE message above typically contains a time-out parameter that can be set to determine the duration of the subscription, sometimes referred to as TTL (Time To Live). If the time-out parameter in a SUBSCRIBE message is set to zero, a notification with requested presence data is obtained just once and the subscription is promptly terminated thereafter. If the time-out parameter is set to a certain time period>0, the subscribing client will receive notifications according to some predetermined scheme until the subscription period expires.

Figure 1:
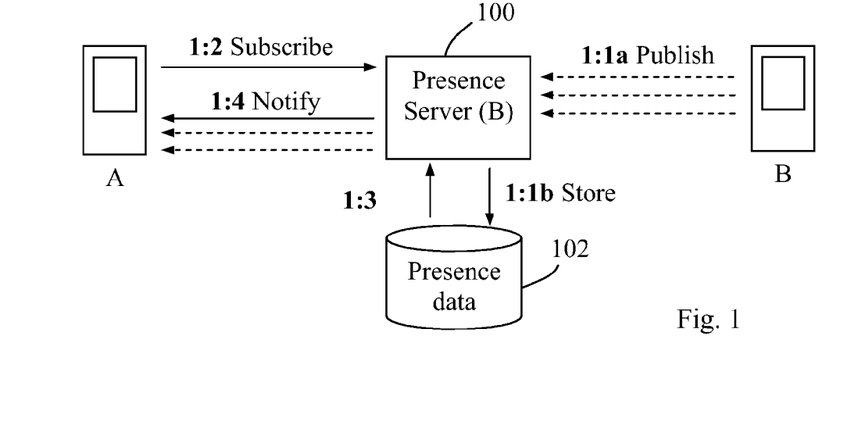
FIG. 1 is a block diagram illustrating a conventional procedure for obtaining presence data of an observed client, according to the prior art.

FIG. 1 illustrates a conventional procedure for providing presence data, involving a subscribing client A, an observed client B and a presence server 100 which stores presence data for client B in a database 102. A first step 1:1a generally illustrates that presence data is published for the observed client B by frequent PUBLISH messages to the presence server 100 according to conventional routines, either sent from client B or from client B's access network (not shown). A next step 1:1b illustrates that database 102 is updated according to the PUBLISH messages of step 1:1a. Steps 1:1a and 1:1b continue throughout in the background, according to prevailing routines.

In a step 1:2, client A sends a SUBSCRIBE message as a subscription request for presence data of client B, in which a time-out parameter for a desired subscription time period is specified. The presence server 100 then retrieves presence data of client B in a step 1:3, and sends it to client A in an initial notification message SIP NOTIFY, as shown in a step 1:4. As indicated by the dashed arrows in step 1:4, client A may receive such notifications on further occasions during the given subscription time, either at regular intervals or whenever the presence data is changed. In order to prolong or "refresh" the subscription, client A automatically sends further SUBSCRIBE messages just before the subscription time expires, and the presence server will then continue to send notifications to client A.

A subscribing client may also subscribe to presence data of several observed clients, which often results in numerous notifications for updated presence data being sent to the subscribing client. An information delivery server called RLS (Resource List Server) can then be used to collect notifications of multiple clients and send a joint notification for all observed clients to the subscribing client, thereby reducing the number of notifications. This joint notification may contain considerable amounts of data.

Figure 2:
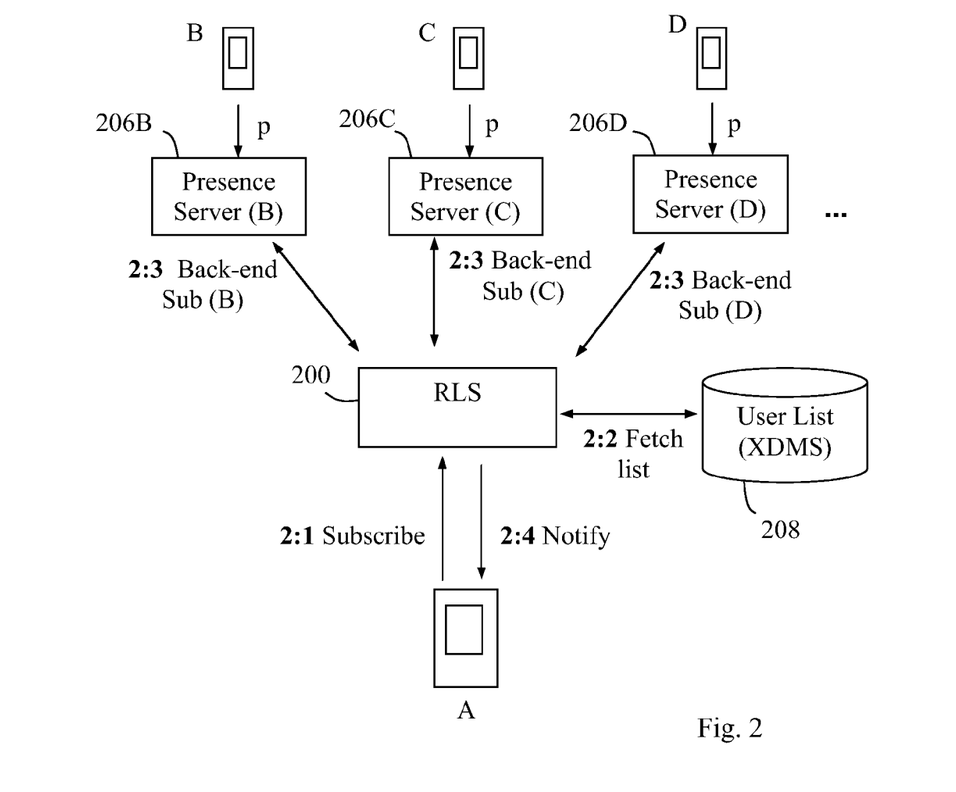
FIG. 2 is a block diagram illustrating a conventional procedure for providing notifications with presence data of plural observed clients using an RLS node, according to the prior art.

FIG. 2 illustrates an RLS 200 providing information to a subscribing client A on clients B, C and D which publish data p to their respective presence servers 206B, 206C and 206D. A user list database 208 maintains various user lists on behalf of subscribing clients such as phone books, contact groups, ad hoc groups or the like. The user lists in database 208 may be configured according to a standard referred to as XDMS (XML (Extensible Markup Language) Document Management Server). In a first shown step 2:1, client A sends a subscription request for presence data on clients B,C,D as indicated by a reference to a predefined user list. RLS 200 then fetches the user list from database 208 in a step 2:2 and establishes back-end subscriptions for presence data of clients B,C,D with presence servers 206B-D to obtain the desired data as notifications therefrom in a step 2:3. In a final step 2:4, RLS 200 sends a joint notification to client A, containing desired data on all clients B-D.

As mentioned above, a notification may contain considerable amounts of data and a subscribing client may also receive several notifications quite frequently, e.g. whenever the observed resources change or update their status or situation. These notifications can potentially become quite expensive for the subscribing client when roaming in a visited network, e.g. on vacation in a foreign country, where higher charging rates are applied as compared to when present in the subscribing client's home network. In addition, some information in the notifications may also be quite uninteresting to the receiving subscriber at present.

Network operators typically have a different charging model for roaming subscribers involving rapidly increasing rates for received amounts of data, while a low cost data rate or "flat" rate is normally applied for subscribers present in the home network. Moreover, the subscriber may not be aware of the higher charging rate for incoming notifications when roaming until receiving the next bill, which might understandably cause frustration and dissatisfaction. As a result, the subscriber may choose to discontinue the resource data subscription(s) or even abandon the home network operator altogether. In general, the problems above could ultimately make the services of providing resource data notifications less attractive.

WO 2008/073009 A1 discloses that notifications with client data are withheld when a subscribing client sends a subscription suspend message to a client data server handling the notifications.

U.S. Pat. No. 6,397,058 B1 discloses that the delivery of an incoming call in a radio communications network is controlled based on the location of a roaming mobile subscriber.

SUMMARY

It is an object of the invention to address at least some of the issues above. In particular, it is an object to provide a solution that can be used to generally reduce the traffic and costs for notifications to roaming subscribers. These objects and others may be obtained by using a method and arrangement according to the attached independent claims.

According to different aspects, a method and an arrangement are provided in a notification server or equivalent unit, for controlling notifications with resource data to a subscribing client. In the method, a subscription request is received from the client for notifications with selected resource data of one or more resources. The access network currently used by the client is then determined, and the delivery of notifications is controlled based on the determined current network. The notification server arrangement comprises a resource data receiver adapted to collect and store resource data in a database, and a subscription manager adapted to receive a subscription request from the client for notifications with selected resource data of one or more resources. The subscription manager is also adapted to determine the access network currently used by the client. The arrangement further comprises a notification sender adapted to control the delivery of notifications based on the determined current network.

The method and arrangement above can be implemented according to different embodiments. In one embodiment, no notifications are delivered if the client is roaming in a visited network, and all upcoming notifications are delivered if the client is present in his/her home network.

In further embodiments, the delivery of notifications can be controlled by applying a notification rule selected based on the determined current network. The notification rule may be defined by means of a delivery filter which allows delivery of, e.g., notifications with a certain type of resource data, notifications not exceeding a maximum data amount, notifications for one or more specific resources, and/or notifications at certain times of day, week or season. Different notification rules can also be applied depending on a time-out or TTL parameter in the subscription request. The notification rule may further include a rate limitation such that the frequency of notifications does not exceed a predefined limit. The notification rule could also dictate that empty notifications devoid of resource data are sent to the client.

In other possible embodiments, the currently used network can be determined based on network related information of the client obtained from, e.g., the received subscription request, a publish message from the client, a third party registration request received from a session control node serving the client, or a SIP message from the client including any of the well-known SIP messages INVITE, MESSAGE or OPTIONS. It is possible to determine the currently used network from a PANI (P-Access-Network-Info) header in the subscription request, or from a P-Visited-Network-ID header in the registration request. The network related information may include any of the parameters MNC (Mobile Network Code) and MCC (Mobile Country Code).

Further features of the present invention and its benefits will become apparent from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Briefly described, the invention can be employed in a notification server or equivalent unit adapted to handle and control the delivery of notifications with resource data to a subscribing client generally depending on the access network currently being used by the client. The notification server functionality described here can be implemented in a presence server or RLS, e.g. located in an IMS network or similar, as described above, although the invention is not limited to using any particular existing node or service network.

The current access network can be determined based on network related information provided in a subscription request from the client, e.g. the SIP SUBSCRIBE message, or in a publish message from the client, or in a third party registration request from a session control node serving the client, or in a SIP message from the client including any of the SIP messages known as INVITE, MESSAGE and OPTIONS. The term "network related information" generally represents any information from which the currently used network can be identified or determined.

For example, a so-called PANI (P-Access-Network-Info) header is normally included in the SUBSCRIBE message sent from a client to initiate a subscription for resource data. Client terminals capable of subscribing for resource data are thus usually adapted to include the PANI header in this message, containing a parameter with network related information referred to as MNC (Mobile Network Code) or MCC (Mobile Country Code). The notification server is then able to determine the current access network by evaluating the MNC or MCC.

Further, when a roaming client registers with an IMS network by sending a REGISTER message, a session control node therein, e.g. S-CSCF, sends a third party REGISTER request to the notification server or presence server. This third party registration request typically contains a so-called P-Visited-Network-ID header which includes network related information that can alternatively be used to determine the current access network. Similar network related information is normally also included in the other messages from the client mentioned above. However, the invention is not limited to these exemplary messages, headers and parameters.

If the notification server determines from the subscription request or publish message or third party registration request or SIP message that the client is currently roaming in a visited network, typically involving a relatively high charging rate for receiving data, the notifications can be withheld altogether in order to avoid traffic and save the extra costs for the client. On the other hand, if the client is present in his/her home network, all upcoming notifications can be allowed for delivery as normal.

It is also possible to apply different notification rules depending on the current access network, such that the delivery of notifications with resource data to a client is controlled according to the applied notification rule. A notification rule may be defined by means of a delivery filter, e.g. only allowing delivery of notifications with a certain type of resource data, notifications not exceeding a maximum data amount, notifications of one or more specific resources, or notifications at certain times of day, week or season.

A notification rule may also include a rate limitation such that the frequency of notifications does not exceed a predefined limit, e.g. not more often than once a day or every third day, etc. It is also possible to control the notification delivery depending on a time-out or TTL parameter given in the subscription request, e.g. by selecting different notification rules. For example, if the TTL is set to zero, delivery of all notifications may be allowed or a delivery filter "x" may alternatively be applied, while if the time-out parameter is set to a certain time period>0, no delivery of notifications may be allowed or a delivery filter "y" may alternatively be applied, and so forth.

In this description, the term "notification server" is used to represent any server capable of providing requested resource data of one or more observed resources in notifications to authorised subscribing clients, e.g. a presence server or RLS node as described for FIGS. 1 and 2, respectively. Further, the term "resource data" refers to data of any resource or object of interest without limitation, such as another client, a document, a content or information service. For example, a notification may refer to changes in an XDMS based contact list or address book to enable synchronisation of contacts in different terminals. Reference will also be made to well-known SIP messages, although the invention is generally not limited thereto.

Figure 3:
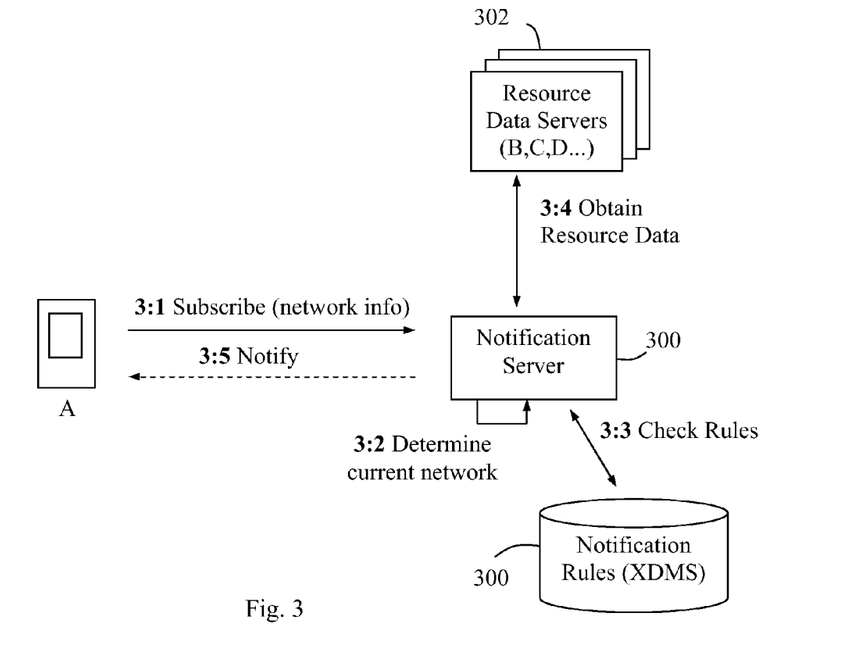
FIG. 3 is a block diagram illustrating a procedure for handling a subscription for resource data of one or more observed resources, according to one embodiment.

A procedure and arrangement according to one example will now be described with reference to FIG. 3 involving a subscribing client A (basically acting as Watcher), a notification server 300 and one or more resource data servers 302 capable of providing resource data of respective resources B,C,D . . . (basically acting as Presentities) to the notification server 300. The resource data may relate to clients, documents, content services, etc. In general, this invention is not limited to any specific types of resources or resource data.

A first step 3:1 illustrates that client A sends a subscription request, e.g. as a SIP SUBSCRIBE message, to the notification server 300 requesting for notifications with resource data of one or more observed resources B, C, D . . . , basically according to a conventional process. These resources of interest may be specified in the request by means of a resource list or the like referring to a predefined document in a conventional manner that can be accessed by the notification server 300, e.g. from a suitable database, not shown. It is further assumed that the subscription request also conventionally comprises network related information, e.g. the parameter MCC or MNC contained in a PANI header or any similar information indicating the current access network used.

In a next step 3:2, notification server 300 determines the current access network based on the network related information in the received subscription request. As mentioned above, it may also be possible to determine the current access network based on network related information in a third party registration request received from a session control node for the client. In that case, notification server 300 can obtain the network related information, e.g., from the P-Visited-Network-ID header of the third party registration request received from a CSCF node. Another alternative is that the network related information can be obtained from a publish message sent from the client when present in a visited network, if the client has previously established a subscription for resource data notifications when present in the home network. Network related information can also be obtained from a SIP message from the client including any of the SIP messages known as INVITE, MESSAGE and OPTIONS, depending on which SIP method is applied.

It is possible to configure the notification server 300 to simply withhold the notifications altogether if the client is found to be roaming in a visited network, and to deliver notifications as normal whenever the client is present in his/her home network. In this example, it is assumed that specific network depending notification rules have been defined for client A and are stored in a suitable database 300 connected to notification server 300. These notification rules may be stored in the database 300 e.g. according to the XDMS standard mentioned above. The notification rules for client A may have been set by the client or defined by default.

Thus, in a following step 3:3, the notification rules in database 300 are checked and a notification rule currently valid for client A is selected therefrom based on the determined current network. Notification server 300 then obtains resource data from the one or more resource data servers 302 as relevant to the selected notification rule, in a further step 3:4. Alternatively, resource data may be collected from resource data servers 302 on a more or less continuous basis, i.e. at any time before or during the shown procedure and regardless of the notification rule currently valid for client A. Notification server 300 is now able to control the delivery of notifications with resource data to client A according to the selected notification rule, e.g. withholding the notifications altogether or applying a delivery filter in the manner described above, as schematically indicated by a final step 3:5.

Figure 4:
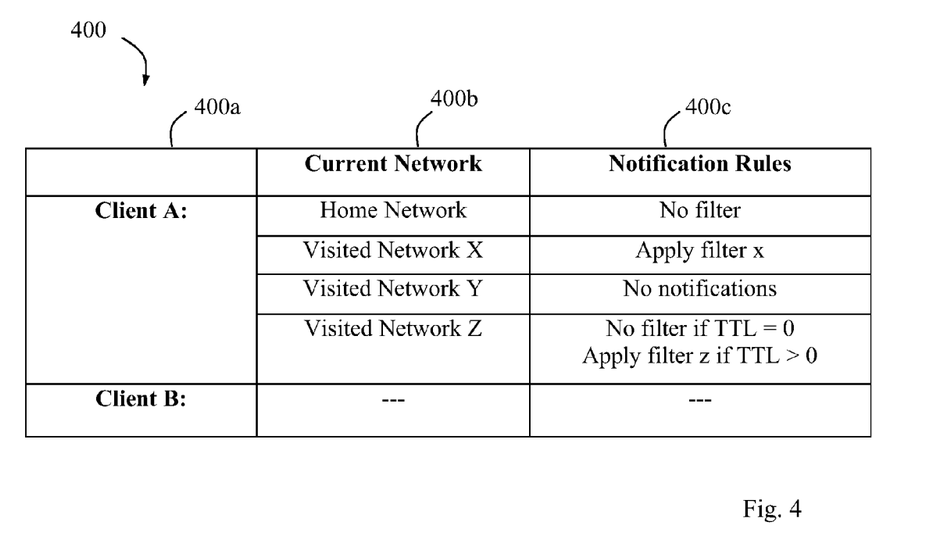
FIG. 4 illustrates some exemplary entries in a notification rules database, according to another embodiment.

In FIG. 4, some exemplary entries in a notification rules database 400 are shown. The database 400 comprises a first column 400a specifying the client, a second column 400b with a current access network, and a third column 400c with notification rules valid for different clients and current networks. In this example, different notification rules have been defined for client A when present in his/her home network and in different visited networks X, Y and Z.

When the client is present in the home network, a corresponding notification rule dictates that no filter is applied, i.e. all due notifications are delivered to the client. When present in visited network X, a corresponding notification rule dictates that a predefined delivery filter "x" is applied for notification delivery. When present in another visited network Y, a corresponding notification rule dictates that no notifications are delivered at all. For example, notifications in network X may result in moderate charging rates while network Y may bring about higher charging rates.

Furthermore, when the client is present in a visited network Z, a corresponding notification rule dictates that no filter is applied if a TTL or time-out parameter in the subscription request is set to zero, and further that a predefined filter "z" is applied if the TTL or time-out parameter is greater than zero. Thereby, the client is able to fetch a notification with resource data once while no further notifications will be delivered.

In another example, a notification rule may dictate that empty notifications are sent, i.e. devoid of resource data, as an alternative to sending no notifications at all. Such empty notifications will then contain very little amounts of data and should therefore not entail excessive costs. This option can be useful to prevent the client from sending repeated subscription requests when no response is received, or to minimise the notifications when the standard procedure prescribes that a notification must always be delivered whenever a subscription is established or refreshed for the client. In general, different notification rules can be defined in the notification rules database 400 for different clients when present in different networks.

Figure 5:
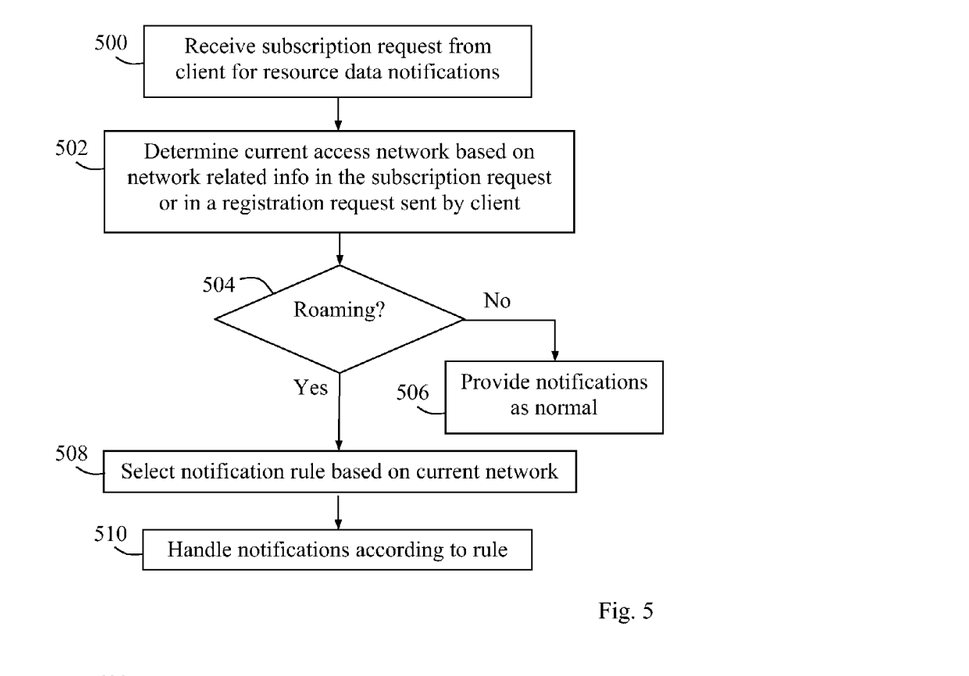
FIG. 5 is a flow chart with steps in a procedure executed by a notification server for controlling notifications with resource data to a subscribing client, according to yet another embodiment.

FIG. 5 illustrates an exemplary flow chart with steps executed by a notification server in a procedure for controlling notifications with resource data to a subscribing client. Again, it is assumed that specific network depending notification rules have been defined for the subscribing client in a configuring operation, which are stored in a notification rules database connected to the notification server, basically in the same manner as described for FIG. 3.

In a first step 500, a subscription request for resource data notifications is received from the client. In a next step 502, the current access network of the client is determined based on network related information which can be obtained from the received subscription request, e.g. an MNC or MCC parameter of the PANI header, or from a publish message from the client, or from a third party registration request sent by a session control node serving the client, e.g. the P-Visited-Network-ID header, or from a SIP message from the client, as described above. Any of these requests and messages can be configured according to a regular standards or formats and the client is thus not affected at all by this solution, apart from being involved with creating the notification rules.

If it is determined in a following step 504 that the client is not roaming in a visited network, i.e. the current access network is the client's home network, notifications with resource data are provided as normal in a step 506, i.e. without applying any specific restrictions or limitations. On the other hand, if it is determined in step 504 that the client is actually roaming in a visited network, a notification rule currently valid for client A is selected from the notification rules database based on the determined current network.

Referring to the examples given in FIG. 4, if the client is roaming in any of networks X, Y or Z given in column 400b, a corresponding notification rule is selected from column 400c in a further step 508, which is applied for notification delivery. Thus, the delivery of resource data is handled according to the selected notification rule, as illustrated by a final step 510.

Figure 6:
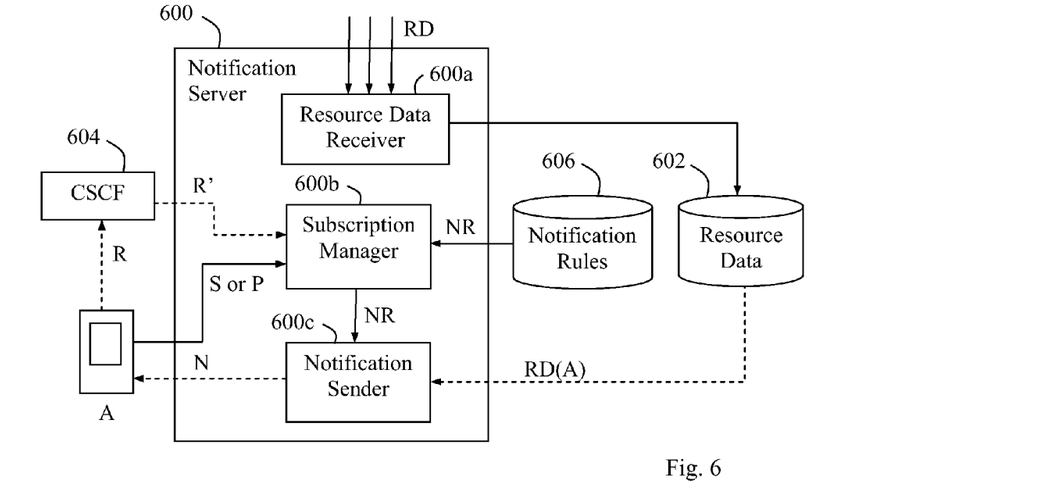
FIG. 6 is a block diagram illustrating a notification server capable of controlling notifications with resource data to a subscribing client, according to further embodiments.

An exemplary notification server capable of controlling notifications with resource data to a subscribing client A, will now be described in more detail with reference to FIG. 6. The notification server 600 may basically be configured to act as the server 300 in FIG. 3 and/or to execute the process shown in FIG. 5. It should be noted that FIG. 6 merely illustrates various functional units in the notification server 600 in a logical sense. However, the skilled person is free to implement these functions in practice using any suitable software and hardware means. Thus, the invention is generally not limited to the shown structure of the notification server 600.

The notification server 600 comprises a resource data receiver 600a adapted to collect and store resource data RD of various resources in a database 602. As described above, resource data may be generally collected on a continuous basis, or resource data RD of one or more specific resources may be collected when a subscription request for notifications with data of those resources is received from the client.

The server 600 further comprises a subscription manager 600b adapted to receive a subscription request S from the client for notifications with resource data of one or more selected resources. Subscription manager 600b is also adapted to determine the access network currently used by the client based on network related information of the client. According to different alternatives, subscription manager 600b may obtain the network related information from the subscription request S, or from a publish message P received from the client, or from a third party registration request R' received from a CSCF node 604 having received a registration request R from the client as shown by dashed arrows in the figure, or from a SIP message from the client, not shown. Subscription manager 600b may further be adapted to check notification rules in a database 606 and to select a notification rule NR currently valid for client A from the database 606 based on the determined current network.

The notification server 600 also comprises a notification sender 600c adapted to control the delivery of notifications N to the client A based on the determined current network, e.g. by applying the notification rule NR selected by the subscription manager 600b.

The solution according to any of the embodiments described above can thus be useful to control and restrict the amount of resource data sent to a subscribing client currently roaming in a visited network. Any excessive roaming costs and traffic for resource data notifications can thereby be reduced or avoided. This solution is also transparent to the client in that no modifications or adaptations are necessary in the client's communication terminal, and regular procedures and protocols can be used for enabling the notification service.

While the invention has been described with reference to specific exemplary embodiments, the description is generally only intended to illustrate the inventive concept and should not be taken as limiting the scope of the invention, which is defined by the appended claims. The IMS technology and the SIP signalling protocol have been occasionally used when describing the above embodiments, although any other suitable standards and protocols may basically be used for implementing the present invention.

The invention claimed is:

1. A method in a notification server for controlling notifications with resource data to a subscribing client, comprising:
   receiving, by the notification server, a subscription request from the client for notifications with selected resource data of one or more resources;
   determining, by the notification server, the access network currently used by the client, wherein the access network comprises a communications network and any one of a home network and a visited network;
   selecting, by the notification server, a valid notification rule from two or more network depending notification rules stored in a database, wherein the database comprises a first column specifying a client, a second column specifying an access network, and a third column with one or more notification rules valid for a client and an access network, wherein the selected valid notification rule is valid for the client and the determined access network currently used by the client; and
   controlling, by the notification server, the delivery of notifications with resource data to the client based on the determined current network, wherein the delivery of notifications is controlled by applying the selected valid notification rule, wherein said valid notification rule is defined by delivery of notifications not exceeding a maximum data amount and delivery of empty notifications devoid of resource data.

2. The method according to claim 1, wherein said network depending notification rules include one or more rules wherein no notifications are delivered if the client is roaming in a visited network, and all upcoming notifications are delivered if the client is present in his/her home network.

3. The method according to claim 1, wherein said notification rule is defined by using a delivery filter.

4. The method according to claim 3, wherein the delivery filter allows delivery of at least one of: notifications with a certain type of resource data, notifications for one or more specific resources, and notifications at certain times of day, week or season.

5. The method according to claim 1, wherein different notification rules are applied depending on a time-out or TTL parameter in the subscription request.

6. The method according to claim 1, wherein the notification rule includes a rate limitation such that the frequency of notifications does not exceed a predefined limit.

7. The method according to claim 1, wherein the currently used network is determined based on network related information of the client obtained from any of: said received subscription request, a publish message from the client, a third party registration request received from a session control node serving the client, and a SIP message from the client including INVITE, MESSAGE or OPTIONS.

8. The method according to claim 7, wherein the currently used network is determined from a PANI (P-Access-Network-Info) header in the subscription request, or from a P-Visited-Network-ID header in the registration request.

9. The method according to claim 7, wherein the network related information includes any of the parameters MNC (Mobile Network Code) and MCC (Mobile Country Code).

10. An arrangement in a notification server for controlling notifications with resource data to a subscribing client, comprising:
   a resource data receiver implemented by the notification server to collect and store resource data in a database;
   a subscription manager implemented by the notification server to:
      receive a subscription request from the client for notifications with selected resource data of one or more resources;
      determine the access network currently used by the client, wherein the access network comprises a communications network and any one of a home network and a visited network; and
      select a valid notification rule from two or more network depending notification rules stored in a database, wherein the database comprises a first column specifying a client, a second column specifying an access network, and a third column with one or more notification rules valid for a client and an access network, wherein the selected valid notification rule is valid for the client and the determined access network currently used by the client; and
   a notification sender implemented by the notification server to control the delivery of notifications with resource data to the client based on the determined current network by applying the selected valid notification rule, wherein said valid notification rule is defined by delivery of notifications not exceeding a maximum data amount and delivery of empty notifications devoid of resource data.

11. The arrangement according to claim 10, wherein the notification sender is further implemented by the notification server, based on one or more of said network depending notification rules, to deliver no notifications if the client is roaming in a visited network, and to deliver all upcoming notifications if the client is present in his/her home network.

12. The arrangement according to claim 10, wherein said notification rule is defined by using a delivery filter.

13. The arrangement according to claim 12, wherein the delivery filter allows delivery of at least one of: notifications with a certain type of resource data, notifications for one or more specific resources, and notifications at certain times of day, week or season.

14. The arrangement according to claim 10, further implemented by the notification server to apply different notification rules depending on a time-out or TTL parameter in the subscription request.

15. The arrangement according to claim 10, wherein the notification rule includes a rate limitation such that the frequency of notifications does not exceed a predefined limit.

16. The arrangement according to claim 10, wherein the subscription manager is further implemented by the notification server to determine the currently used network based on network related information of the client obtained from any of: said received subscription request, a publish message from the client, a third party registration request received from a session control node serving the client, and a SIP message from the client including INVITE, MESSAGE or OPTIONS.

17. The arrangement according to claim 16, wherein the subscription manager is further implemented by the notification server to determine the currently used network from a PANI (P-Access-Network-Info) header in the subscription request, or from a P-Visited-Network-ID header in the registration request.

18. The arrangement according to claim 16, wherein the network related information includes any of the parameters MNC (Mobile Network Code) and MCC (Mobile Country Code).

\* \* \* \* \*